United States Patent [19]

Emi et al.

[11] Patent Number: 5,159,143
[45] Date of Patent: Oct. 27, 1992

[54] INFORMATION RECORDING MEDIUM PLAYER FOR CONTROLLING MUSICAL DEVICES USING A MUSICAL INSTRUMENT DIGITAL INTERFACE (MIDI) FORMAT SIGNAL

[75] Inventors: Tetsuro Emi; Makoto Hijikata, both of Yamanashi, Japan

[73] Assignees: Pioneer Electronic Corporation, Tokyo; Pioneer Video Corporation, Yamanashi, both of Japan

[21] Appl. No.: 645,512

[22] Filed: Jan. 24, 1991

[30] Foreign Application Priority Data

Jun. 18, 1990 [JP] Japan .................... 2-159085

[51] Int. Cl.$^5$ ................... G10H 1/057; G11B 27/10
[52] U.S. Cl. ........................ 84/645; 84/618; 84/600; 369/47; 369/33
[58] Field of Search ................ 369/48, 69, 70, 47, 369/64, 63, 33, 32, 86; 360/18, 27, 40, 48, 61, 69, 79; 84/645, 618, DIG. 2, 611, 645, 615, 616, 621, 622, 626, 653, 600; 358/335

[56] References Cited

U.S. PATENT DOCUMENTS

| | | |
|---|---|---|
| 4,703,680 | 11/1987 | Wachi et al. ............ 84/DIG. 2 |
| 4,706,538 | 11/1987 | Yoshida ................. 84/DIG. 2 |
| 4,903,565 | 2/1990 | Abe ........................ 84/611 |
| 4,922,796 | 5/1990 | Kondo et al. ............. 84/618 |
| 4,942,551 | 7/1990 | Klappert et al. ......... 360/32 X |
| 4,953,035 | 10/1990 | Yoshio ................. 358/335 X |
| 4,989,097 | 1/1991 | Yoshio et al. ......... 358/335 X |
| 4,992,886 | 2/1991 | Klappert .............. 358/342 X |
| 4,995,026 | 2/1991 | Malcabe et al. ......... 369/70 X |
| 4,996,679 | 2/1991 | Yoshio .................... 369/32 |
| 5,009,147 | 4/1991 | Yamamori ............... 84/618 |
| 5,010,417 | 4/1991 | Yoshio et al. ......... 358/335 X |
| 5,016,113 | 5/1991 | Yamashita ............ 358/342 X |
| 5,062,097 | 10/1991 | Kumaoka ................ 360/79 |

Primary Examiner—Aristotelis Psitos
Assistant Examiner—Thang V. Tran
Attorney, Agent, or Firm—Sughrue, Mion, Zinn, Macpeak & Seas

[57] ABSTRACT

An information recording medium player which extracts a main code and a subcode from a read-out signal obtained by playing a recording medium; detects, as a select signal, an information bit signal in a MIDI format signal acquired by decoding the subcode, and distributes a channel message signal in the MIDI format signal to a plurality of output terminals in accordance with the select signal, thereby relatively increasing the data transfer rate.

5 Claims, 5 Drawing Sheets

Fig. 3B

| MODE | ITEM | CONTENTS |
|---|---|---|
| 0 | 0 | NO DATA |
| 1 | 0 | LINE GRAPHICS |
| 1 | 1 | TV GRAPHICS |
| 3 | 0 | MIDI MODE |
| 7 | 0 | USER MODE |

Fig. 4

| | R | S | T | U | V | W |
|---|---|---|---|---|---|---|
| 0 | 0 | 1 | 1 | 0 | 0 | 0 |
| 1 | n5 | n4 | n3 | n2 | n1 | n0 |
| 2,3 | PARITY BITS Q0,1 | | | | | |
| 4 | B | 1 | | | | |
| 5 | | | B | 2 | | |
| 6 | | | | | B | 3 |
| 7 | | | | | | |
| 8 | B | 4 | | | | |
| 9 | | | B | 5 | | |
| 10 | | | | | B | 6 |
| 11 | | | | | | |
| 12 | B | 7 | | | | |
| 13 | | | B | 8 | | |
| 14 | | | | | B | 9 |
| 15 | | | | | | |
| 16 | B | 10 | | | | |
| 17 | | | B | 11 | | |
| 18 | | | | | B | 12 |
| 19 | | | | | | |
| 20〜23 | PARITY BITS P0-3 | | | | | |

INFORMATION RECORDING MEDIUM PLAYER FOR CONTROLLING MUSICAL DEVICES USING A MUSICAL INSTRUMENT DIGITAL INTERFACE (MIDI) FORMAT SIGNAL

BACKGROUND OF THE INVENTION

1. Field of the Invention

The present invention relates to a player for playing a recording medium having a MIDI (Music Instrument Digital Interface) format signal recorded thereon as subcodes of a CD format.

2. Description of the Related Art

There is known a system, which has a musical instrument such as a synthesizer, an electronic piano or a rhythm machine, connected together to exchange information therebetween for enjoyment of musical tones. The MIDI standard has been set as the international standard for such information exchange.

There has also been known a player which plays a recording medium on which a MIDI format signal bearing music information according to the MIDI standard is recorded, thereby acquiring a MIDI format signal serving as a control signal for playing a musical instrument. The MIDI format signal includes a channel message signal and a system message signal. The channel message signal is a command signal for supplying to a musical instrument with a playing manner command determining tone, length, strength of a sound to be produced. On the other hand, the system message signal is an information signal carrying thereon control information for the whole system without respect to any channel. Subcodes bearing play control information are recorded on a recording medium, such as a disk, e.g., a CD, CD-V, or LD (Laser Disk) carrying thereon a video signal as well as audio information in the form of the CD format, or a DAT (Digital Audio Tape). Each subcode in the CD format consists of eight channels, P, Q, R, S, T, U, V and W, the first two channels, P and Q, being used as control signals for a recording medium player.

The other six channels, R to W, are so-called user's bits which may be exploited for transferring graphics information. These channels may be used as the aforementioned MIDI format signal, the standard for which has already been proposed.

A conventional decoder which decodes such a subcode to acquire a MIDI format signal has an output port structure for a single system. Since the information transfer rate according to the MIDI standard is lower than the subcode transfer rate according to the standard for the afore- mentioned CD, LD and so forth, the data transfer speed is restricted, thus requiring a wasted time. Further, when multiple MIDI devices are to be used, the conventional serial connection of those MIDI devices undesirably increases the amount of a delay between the MIDI devices to be controlled.

SUMMARY OF THE INVENTION

It is therefore an object of the present invention to provide an information recording medium player which improves the transfer rate for effective utilization of MIDI data recorded in a subcode R to W data area and reduces the amount of a delay between MIDI device to be controlled.

To achieve this object, according to the present invention, there is provided an information recording medium player for playing an information recording medium including an information signal as a main code and a MIDI format signal as a subcode to reproduce the information signal, decoding the subcode to acquire the MIDI format signal and producing the MIDI format signal, which player comprises a detection means for detecting, as a select signal, an information bit signal corresponding to at least one channel message signal included in the MIDI format signal; and a relay means for distributing the channel message signal in the MIDI format signal to a plurality of output terminals in accordance with the select signal from the detection means.

According to the information recording medium player of the present invention, channel information corresponding to a channel message in the MIDI format signal acquired by decoding a subcode recorded in a multiplexed manner, or an information signal such as a dummy bit is detected as a select signal, and the channel message in the MIDI format signal is distributed to a plurality of output terminals in accordance with the select signal.

BRIEF DESCRIPTION OF THE DRAWINGS

FIG. 3B is a table showing part of the subcode indicating modes; and

FIG. 4 is a table showing a MIDI format.

DETAILED DESCRIPTION OF THE PREFERRED EMBODIMENT

A preferred embodiment of the present invention will now be described referring to the accompanying drawings.

Figure 1:
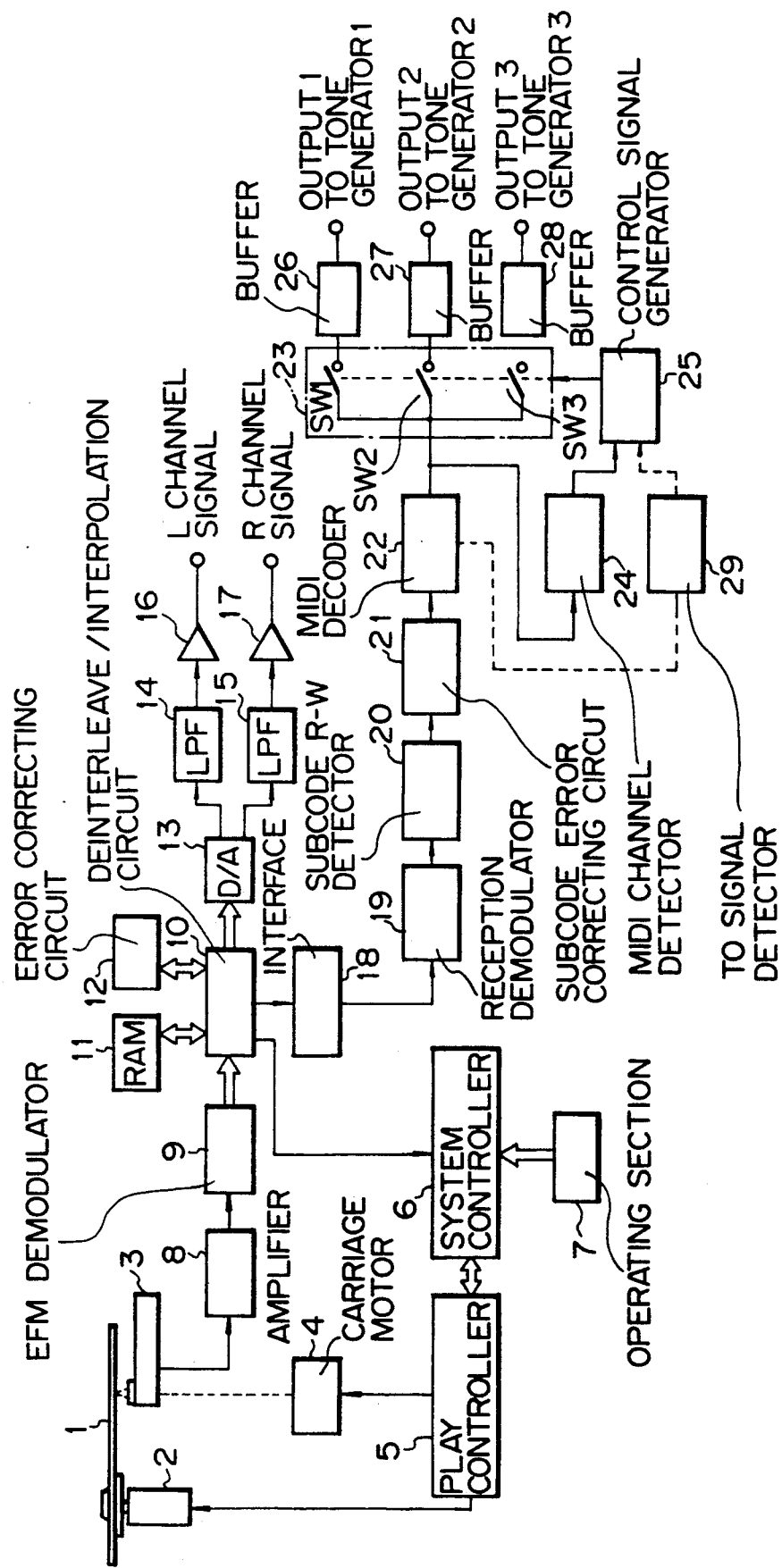
FIG. 1 is a block diagram illustrating one embodiment of the present invention.

In FIG. 1, a digital audio disk (hereafter simply referred to as "disk") 1 is rotated by a spindle motor 2. A signal recorded on the disk 1 is read out by a pickup 3. The pickup 3 includes a laser diode, an objective lens, a focus actuator, a tracking actuator, and a photodetector. The pickup 3 is supported on a carriage (not shown) which is moved in the radial direction of the disk 1 by a carriage motor 4. The spindle motor 2 and the carriage motor 4 are driven by a playing controller 5. A system controller 6 controls the controller 5 and other servo systems (not shown), based on a user command or the like from an operating section 7.

A so-called RF signal from the pickup 3 is amplified by an RF amplifier 8, supplied to an EFM demodulator circuit 9, then demodulated to a 8-bit digital signal which is supplied to the next stage. This 8-bit digital signal consists of a main code carrying PCM audio signals of both left and right channels, and a subcode carrying a MIDI format signal. The digital signal is sent from the EFM demodulator circuit 9 to a deinterleave and interpolation circuit 10. Since this digital signal has been interleaved (rearranged) at the time of recording, it is rearranged again in the original order (deinterleaved) by the deinterleave and interpolation circuit 10 and a RAM 11, and is supplied to an error-correcting circuit 12. The digital signal having undergone error correction in the error correcting circuit 12 is sent again to the deinterleave and interpolation circuit 10, and is separated into a main code and a subcode.

The main code or the digital audio signal is sent to a D/A converter 13, from which it is supplied as analog audio signals of the left and right channels to low-pass filters 14 and 15. The low-pass filters 14 and 15 eliminate unnecessary high frequency components of the signals, and the resultant signals are supplied from the audio output terminal through amplifying circuits 16 and 17 to the next stage.

Figure 2:
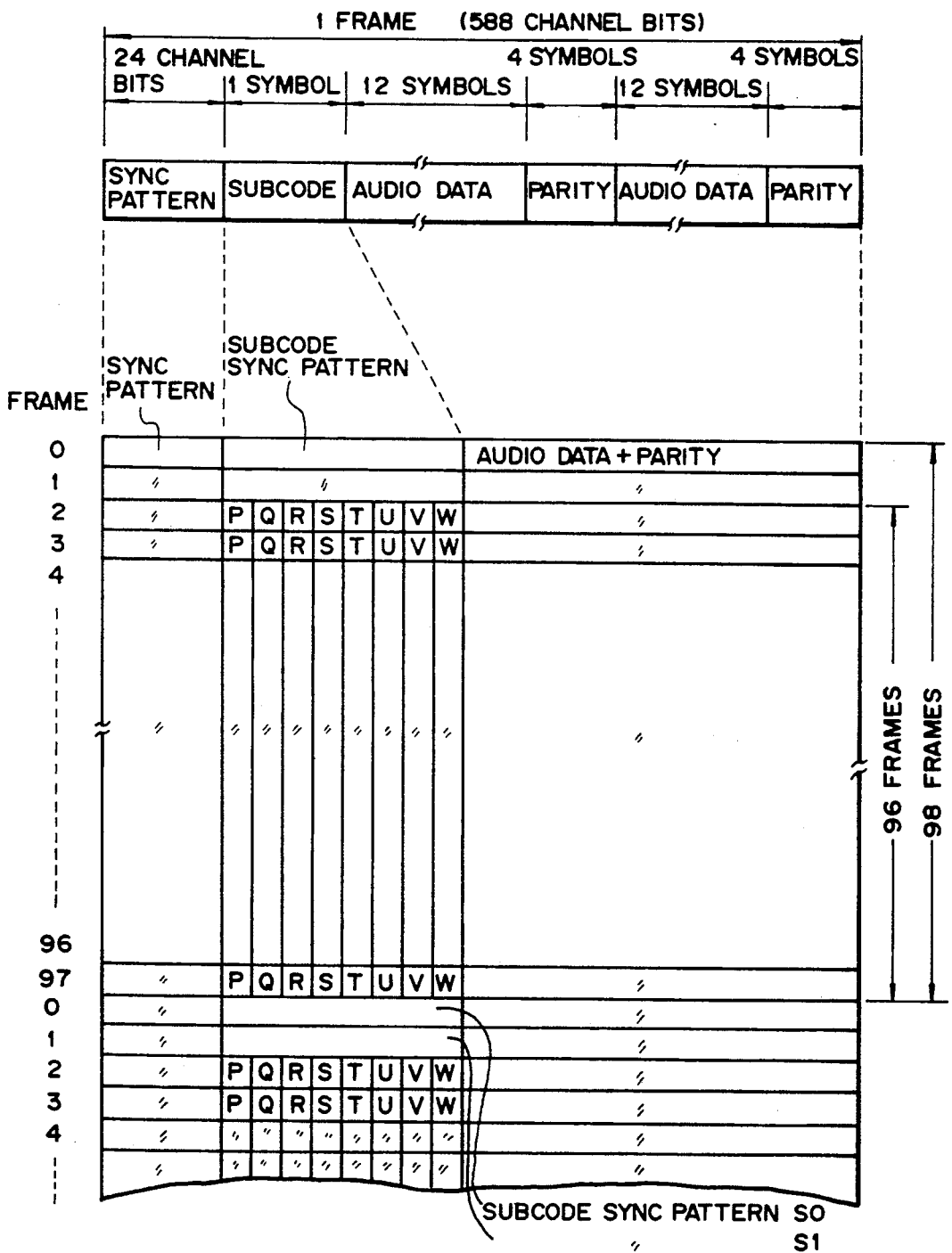
FIG. 2 is a table showing the format of a subcode.

The subcode consists of 98 frames as a unit, each of which has 588 channel bits. Two frames are used for data synchronization while the remaining 96 frames are divided into eight channels, P, Q, R, S, T, U, V, and W, and 8 bits per frame. FIG. 2 illustrates this subcode format. The two channels, P and Q out of the eight are designated as player system control signals. The P channel is used to discriminate whether a timing is between pieces of music or within a music piece; the P channel is "1" for the former timing, and "0" for the latter timing. The Q channel data is used as a time code usable for random-accessing, for example.

The P and Q channel signals are sent to the system controller 6 from the deinterleave and interpolation circuit 10, and are used for operation commands such as "play", "search", and "jump" in respect to the playing controller.

Figure 3A:
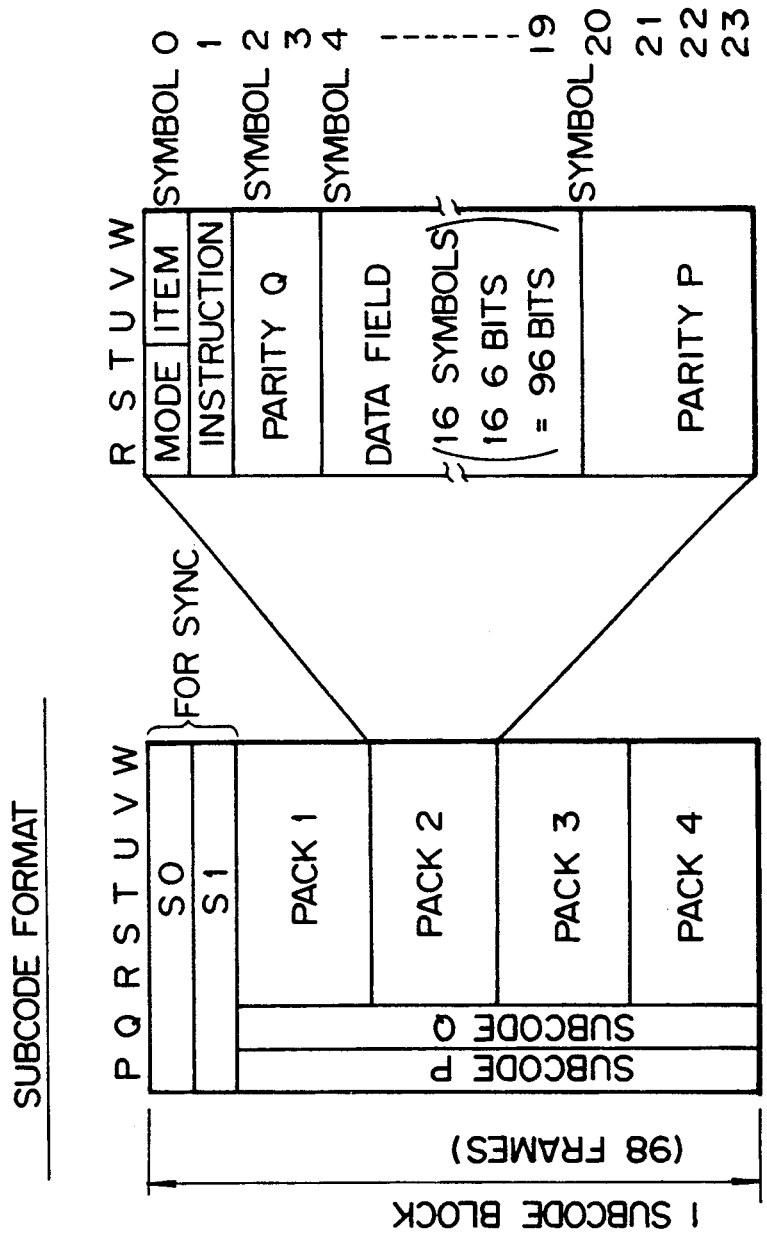
FIG. 3A is a diagram illustrating how the subcode is divided.

The other six channels R to W of each of 96 frames is further divided into four packs each of which includes 24 symbols (symbols 0 to 23), each consisting of six bits. FIG. 3(a) shows the format for this structure. In FIG. 3(a), the symbol 0 has upper three bits for a mode, and lower three for an item; for example, the mode "1" and item "1" indicate a mode for television graphic while the mode "1" and item "0" indicate a mode for line graphic, such as an LCD display. In the case of the present invention, a user mode is specified with the mode "3" and item "0". FIG. 3(b) illustrates examples of the individual modes.

In FIG. 3(a), the symbol 1 is used as an instruction which shows the property of data in data fields of the symbols 4 to 19. The symbols 2, 3, and 20 to 23 are used for parity codes of error correction.

In FIG. 1, the subcode is sent from the deinterleave and interpolation circuit 10 through an interface circuit 18 and a reception demodulator circuit 19 to a subcode R to W detector 20 where the R to W subcodes are extracted and supplied to a subcode error correcting circuit 21. FIG. 4 illustrates the format of the MIDI-mode subcode which carries the MIDI format signal.

In FIG. 4, the lower four bits (n3 to n0) of the symbol 1 represents the number of bytes in the data field. The data field is a channel message signal consisting of 12 bytes B1 to B12. One channel message signal includes one byte status and 1-byte or 2-byte data. The upper four bits of the status indicate information, such as note-on and note-off, while the following lower four bits indicate the channel number. The next one byte of the status indicates 128 note numbers, 0 to 127, showing a scale. The second byte is optional, representing sound dynamic called velocity. The second byte does not exist within the channel message signal to MIDI devices which cannot add the sound dynamic. The MIDI format signal including such a one-pack message signal is subjected to error correction by parities Q0, Q1, and P0 to P3, and the resultant signal is sent to an MIDI decoder 22.

The MIDI format signal, which is decoded by the MIDI decoder 22, is supplied to a relay circuit 23, and also to a MIDI channel detector 24, which in turn detects the channel number in the channel message signal as a select signal. The select signal detected and extracted by the detector 24 is supplied as a control signal corresponding to the select signal to the relay circuit 23 through a control signal generator circuit 25.

The relay circuit 23 has three output ports, and a SW1, a SW2, and a SW3 serve to enable and disable the transition to these ports. The control signal controls the SW1 to SW3, to issue the channel message signal according to the select signal from the output ports. The control signal generator produces those control signals so that channel Nos. 1, 2 and 8 correspond to the output terminal 1; channels Nos. 3, 4, 5 and 8 correspond to the output terminal 2; and the channel Nos. 1, 6, 7 and 8 correspond to the output terminal 3, for example.

The MIDI format signal from the relay circuit 23 is output as a serial signal at a transfer rate of 36 Kbits/sec. Since the MIDI standard specifies the transfer rate of the MIDI format signal to be 31.25 Kbits/sec., however, the transfer rate is changed by buffers 26, 27 and 28, and the signal is issued from three output terminals 1 to 3.

According to the present embodiment, the channel numbers of the channel message signal are used as a select signals. The upper two bits which are dummy bits, in symbol 1 in FIG. 4 may be used as an identification signal and when during the play, this 2-bit identification signal may be supplied to the control signal generator circuit. In this case, the MIDI channel detector circuit 24 may be used instead of an identification signal detector circuit 29.

According to the present invention as described above, an information signal corresponding to a channel message signal in a MIDI format signal is detected as a select signal, and the channel message signal in the MIDI format signal is distributed to a plurality of output terminals in accordance with the detected select signal. This arrangement can therefore permit connection of a single MIDI device to each output terminal to ensure simultaneous control of multiple MIDI devices, thus improving the relative transfer rate and making it possible to avoid an operational delay which may be caused by connecting multiple MIDI device tandem.

What is claimed is:

1. An information recording medium player for reproducing an information recording medium having recorded thereon a main code representing a main information signal and a subcode representing a Musical Instrument Digital Interface (MIDI) format signal, the player reproducing the information signal, and decoding the subcode to acquire the MIDI formal signal, the player outputting the MIDI format signal thus decoded so as to control a musical device connected to the player, the player comprising:

detection means for detecting at least one channel message signal included in the MIDI format signal, said message signal identifying at least one channel number for which said channel message is to be output, and generating a select signal corresponding to said at least one channel number thus identified; and relay means for distributing the channel message signal in the MIDI format signal to at least one of a plurality of output terminals associated with said at least one channel number in accordance with the select signal from the detection means.

2. An information recording medium player according to claim 1, wherein the select signal is a dummy signal for identifying each pack of subcodes.

3. A Musical Instrument Digital Interface (MIDI) decoder for decoding the subcode of a MIDI formal signal reproduced from a signal source, said MIDI format signal including a plurality of channel messages and channel numbers, the decoder comprising:

detection means for detecting at least one channel message included in the MIDI format signal, said channel message identifying a channel number for which said channel message is to be output, and for generating a select signal corresponding to the at least one channel number thus identified; and relay means for distributing the channel message in MIDI format to at least one of a plurality of output terminals associated with said at least one identified channel number in accordance with the select signal generated by the detection means.

4. An information recording medium player according to claim 1, wherein said channel message comprises a plurality of dummy bits used to identify said channel number.

5. A MIDI decoder according to claim 3, wherein said channel message comprises a plurality of dummy bits used to identify said channel number.

* * * * *